United States Patent
Zhang et al.

(10) Patent No.: US 9,055,527 B2
(45) Date of Patent: Jun. 9, 2015

(54) METHOD AND SYSTEM FOR DETERMINING A TIME SYNCHRONIZATION OFFSET BETWEEN RADIO BASE STATIONS

(75) Inventors: Chunhui Zhang, Beijing (CN); Youping Su, Beijing (CN); Jacob Österling, Järfälla (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 95 days.

(21) Appl. No.: 12/991,022

(22) PCT Filed: May 6, 2010

(86) PCT No.: PCT/CN2010/000633
§ 371 (c)(1),
(2), (4) Date: Nov. 4, 2010

(87) PCT Pub. No.: WO2011/137561
PCT Pub. Date: Nov. 10, 2011

(65) Prior Publication Data
US 2013/0070726 A1    Mar. 21, 2013

(51) Int. Cl.
*H04J 3/06* (2006.01)
*H04W 56/00* (2009.01)

(52) U.S. Cl.
CPC ...... *H04W 56/0035* (2013.01); *H04W 56/0045* (2013.01)

(58) Field of Classification Search
USPC .............................. 370/331; 375/356; 455/436
See application file for complete search history.

(56) References Cited

U.S. PATENT DOCUMENTS

| 5,872,774 A | 2/1999 | Wheatley et al. |
| 6,493,539 B1 | 12/2002 | Falco et al. |

(Continued)

FOREIGN PATENT DOCUMENTS

| EP | 1 073 216 A2 | 1/2011 |
| WO | WO 01/15340 A1 | 3/2001 |

(Continued)

OTHER PUBLICATIONS

3GPP. 3rd Generation Partnership Project; Technical Specification Group Radio Access Network; Evolved Universal Terrestrial Radio Access (E-UTRA); Physical Layer Procedures (Release 9). 3GPP TS 36.213 V9.2.0 (Jun. 2010).

(Continued)

*Primary Examiner* — Brandon Renner
*Assistant Examiner* — Scott M Sciacca (57) ABSTRACT

The present invention relates to a method and a device for time synchronization of an RBS which has lost its GPS signal. The method in the time synchronization device comprises retrieving from the first radio base station a first timing advance value (710) used by the user equipment to adjust its transmission timing before the handover, and a measurement of a reception timing (720) of a random access preamble. The random access preamble is transmitted from the user equipment to the second radio base station during synchronization. The method also comprises retrieving (730) from the second radio base station a second timing advance value used by the user equipment to adjust its transmission timing after the handover, and determining (740) a time synchronization offset between the first and second radio base station based on the retrieved first timing advance value, the second timing advance value, and the measurement of the reception timing.

17 Claims, 10 Drawing Sheets

(56) References Cited

U.S. PATENT DOCUMENTS

| | | |
|---|---|---|
| 2004/0051663 A1* | 3/2004 | Martikkala .................. 342/387 |
| 2004/0128095 A1 | 7/2004 | Oestreich |
| 2008/0084849 A1* | 4/2008 | Wang et al. .................. 370/332 |
| 2008/0182579 A1* | 7/2008 | Wang et al. .................. 455/436 |
| 2008/0267127 A1* | 10/2008 | Narasimha et al. .......... 370/331 |
| 2009/0238126 A1* | 9/2009 | Sato et al. .................... 370/329 |
| 2011/0080896 A1* | 4/2011 | Krishnamurthy et al. .... 370/336 |
| 2011/0211537 A1* | 9/2011 | Sivanesan et al. ............ 370/329 |
| 2011/0294510 A1* | 12/2011 | Wigren et al. ................ 455/440 |
| 2011/0317613 A1* | 12/2011 | Gerstenberger et al. ...... 370/312 |
| 2013/0153298 A1* | 6/2013 | Pietraski et al. ............... 175/45 |
| 2013/0231154 A1* | 9/2013 | Whinnett ...................... 455/522 |

FOREIGN PATENT DOCUMENTS

| | | | |
|---|---|---|---|
| WO | WO 02/41540 A | 5/2002 | |
| WO | WO 2008133567 A1 * | 11/2008 | ............. H04L 27/26 |
| WO | WO 2010/035100 A1 | 4/2010 | |

OTHER PUBLICATIONS

3GPP. 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8). 3GPP TS 36.300 V8.3.0 (Dec. 2007).

\* cited by examiner

METHOD AND SYSTEM FOR DETERMINING A TIME SYNCHRONIZATION OFFSET BETWEEN RADIO BASE STATIONS

TECHNICAL FIELD

The present invention relates to a method and a time synchronization device in a radio base station of a wireless communication system. In particular it relates to determining a time synchronization offset between radio base stations.

BACKGROUND

Figure 1:
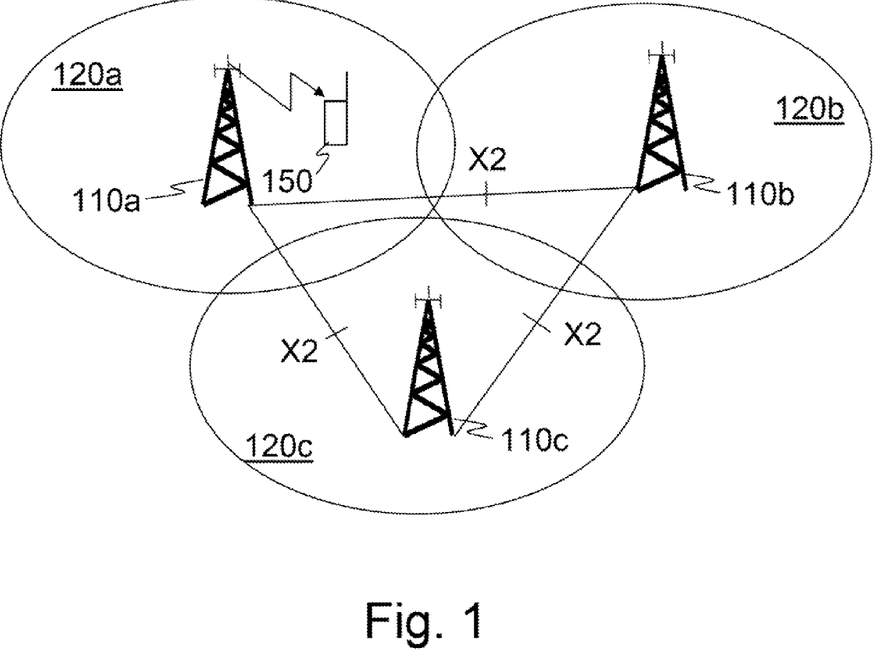
FIG. 1 illustrates schematically a conventional LTE radio access network wherein the present invention may be implemented.

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS system and evolved UTRAN (e-UTRAN) is the radio access network of an LTE system. As illustrated in FIG. 1, an e-UTRAN typically comprises user equipments (UE) 150 wirelessly connected to radio base stations (RBS) 110a-c, commonly referred to as eNodeB. The eNodeB serves one or more areas referred to as cells 120a-c. In FIG. 1 the UE 150 is served by the serving cell 120a. Cells 120b and 120c are neighboring cells. In e-UTRAN the eNBs 110a-c are directly connected to the core network and may communicate with each other over the X2 interface. In a UTRAN however, the RBSs or NodeBs (NB) are connected to the core network via a Radio Network Controller which controls the NBs connected to it.

There are several reasons for why synchronized RBSs are used. In Time-Division Duplex (TDD) systems such as TDD-LTE, TDD-UMTS and Time Division Synchronous Code Division Multiple Access (TD-SCDMA) where time-division multiplexing is used to separate uplink and downlink signals, the synchronization is mandatory. The NBs need to be synchronized with a certain predefined frequency and phase accuracy. The requirement for phase alignment is less than 3 µs and the frequency accuracy should be within 50 ppb. In Frequency-Division Duplex (FDD) systems such as FDD-LTE and FDD-UMTS, where different frequencies are used for uplink and downlink signals, time synchronization is optional. However, the synchronization is necessary for the performance of certain services and algorithms, such as Multicast Broadcast Single Frequency Networks (MBSFN) and inter-cell interference coordination. In general, synchronized radio networks allow for a higher capacity in the network.

According to the 3GPP standard, the inter-RBS air time synchronization is achieved by a Global Positioning System (GPS) satellite. A signal from the satellite indicates the GPS time which provides an absolute timing reference. The GPS time may e.g. be used to synchronize the frame time over the air and thereby an inter-RBS air time synchronization may be achieved.

A problem with using GPS for the synchronization is that the GPS signal may be unavailable due to e.g. bad weather or due to a faulty GPS receiver. However, the RBS will still need to provide service to UEs, preferably until the GPS signal is recovered. Typically, the requirement on the operator of the network is to be able to provide the service to the users at least during 24 hours of GPS unavailability. This is approximately the time needed to receive a notification of the faulty GPS receiver and to send someone to replace it. The sustainability of the RBS service during the absence of the GPS signal is a very important characteristic of the system, especially for TDD systems where the synchronization is mandatory for a functioning network. For FDD systems, it is important for the maintenance of a high system capacity and for certain services.

One solution to keep phase stability when no GPS signal can be received is to use an Oven mounted Voltage Controlled Crystal Oscillator (OVCXO) which can maintain very high frequency stability at the absence of a time reference signal during a longer time than an ordinary oscillator. An OVCXO would enable maintenance of a stable phase (+/−1.5 µs) without the GPS signal during 24 hours, while an ordinary oscillator that is commonly used in the RBS maintains phase stability during around 30 minutes. The drawback of the OVCXO is that it is very expensive.

Another possible solution to improve phase stability when no GPS signal can be received is to use a grand master clock and distributed slave clock concept, e.g. according to IEEE 1588 specifications. However, this solution is based on a special packet exchange procedure to compensate the time the packet takes to traverse the network, and as the packet latency will depend on the network load, the timing accuracy of such a solution cannot be assured. Another drawback is that network elements that do not support the solution will degrade the timing accuracy achieved in the slave clock.

SUMMARY

The object of embodiments of the present invention is to address some of the problems and disadvantages outlined above, and to prolong the RBS phase stability in an accurate and cost efficient way when the GPS signal for the reference timing is lost. Another object is to establish time synchronization in an FDD system without using a GPS signal. These objects and others are achieved by the method and device according to the independent claims, and by the embodiments according to the dependent claims.

In accordance with a first aspect of the present invention, a method for a time synchronization device connected to a first and a second radio base station of a wireless communications system is provided. The method is performed after the first radio base station has transmitted a handover command to a user equipment, the command indicating a handover to the second radio base station. The method comprises retrieving from the first radio base station a first timing advance value used by the user equipment to adjust its transmission timing before the handover, and a measurement of a reception timing of a random access preamble. The random access preamble is transmitted from the user equipment to the second radio base station during synchronization. The method also comprises retrieving from the second radio base station a second timing advance value used by the user equipment to adjust its transmission timing after the handover, and determining a time synchronization offset between the first and second radio base station based on the retrieved first timing advance value, second timing advance value, and measurement of the reception timing.

In accordance with a second aspect of the present invention, a time synchronization device, connectable to a first and a second radio base station of a wireless communications system is provided. The device comprises a first retrieving unit configured to retrieve from the first radio base station a first timing advance value used by a user equipment to adjust its transmission timing before a handover from the first to the second radio base station, and a measurement of a reception timing of a random access preamble transmitted by the user equipment to the second radio base station during synchronization. The device also comprises a second retrieving unit configured to retrieve from the second radio base station a second timing advance value used by the user equipment to adjust its transmission timing after the handover. Furthermore, the device comprises a determining unit configured to determine a time synchronization offset between the first and second radio base station based on the retrieved first timing advance value, second timing advance value and measurement of the reception timing.

In accordance with a third aspect of the present invention, a radio base station comprising a time synchronization device according to the second aspect is provided.

An advantage of embodiments of the present invention is that they allow for a prolonged RBS service time when the GPS time reference signal is lost.

Another advantage of embodiments of the present invention is that they make it possible to establish time synchronization in a FDD system even without a GPS signal.

Still another advantage of embodiments of the present invention is that no expensive hardware is needed for the implementation, thus enabling a low cost solution.

A further advantage of embodiments of the present invention is that a synchronized time base may be maintained between pairs of RBS. If one of the RBS has access to a GPS source, either directly or via another pairing, the RBS also maintain synchronization towards the GPS.

Other objects, advantages and novel features of the invention will become apparent from the following detailed description of the invention when considered in conjunction with the accompanying drawings.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular embodiments of the invention are described in a non-limiting general context in relation to an e-UTRAN. It should though be noted that the invention and its exemplary embodiments may also be applied to other types of radio access networks with a similar random access procedure.

In embodiments of the present invention, the problem of adjusting the time synchronization of an eNodeB (eNB) that has lost the GPS time reference signal e.g. due to a faulty GPS receiver is addressed by a solution which is dependent on a user equipment (UE) handover between two eNBs, one of them being the eNB that needs to be time synchronized. Timing advance (TA) values used by the UE performing the handover are retrieved from the source eNB and the target eNB. The first TA value is the one used by the UE to adjust its timing before the handover and is thus retrieved from the source eNB. The second TA value is the one used by the UE after the handover and is retrieved from the target eNB. Furthermore, the source eNB measures reception timing of the random access preamble which is transmitted by the UE to the target eNB in order for the UE to obtain uplink synchronization. A prerequisite for the solution according to embodiments of the present invention is that one of the eNBs involved in the handover procedure has access to a GPS time reference signal, or at least that one of the eNBs has currently sufficient time synchronization accuracy, e.g. in the case when one of the eNB gets its timing from still another eNB which is GPS locked.

The TA value is a parameter that implicitly contains the distance to the eNB that the UE currently communicates with. A UE needs this parameter to compensate for the propagation delay by start transmission of data earlier the farther away it is from the eNB. If no adjustment is made, transmissions from UEs far away from the eNB may arrive at the same time as a transmission from a UE closer to the eNB and the time alignment of receptions in the eNB is thus lost. The TA parameter value is derived from the uplink received timing at the eNB, either of a random access preamble or of an ordinary data transmission, and is transmitted to the UE. The UE will use the TA value to advance or delay its timing of transmissions to the eNB, so as to compensate for the propagation delay. In this way the eNB can control the transmissions from different UEs to be time aligned with the receiver window of the eNB.

Figure 2:
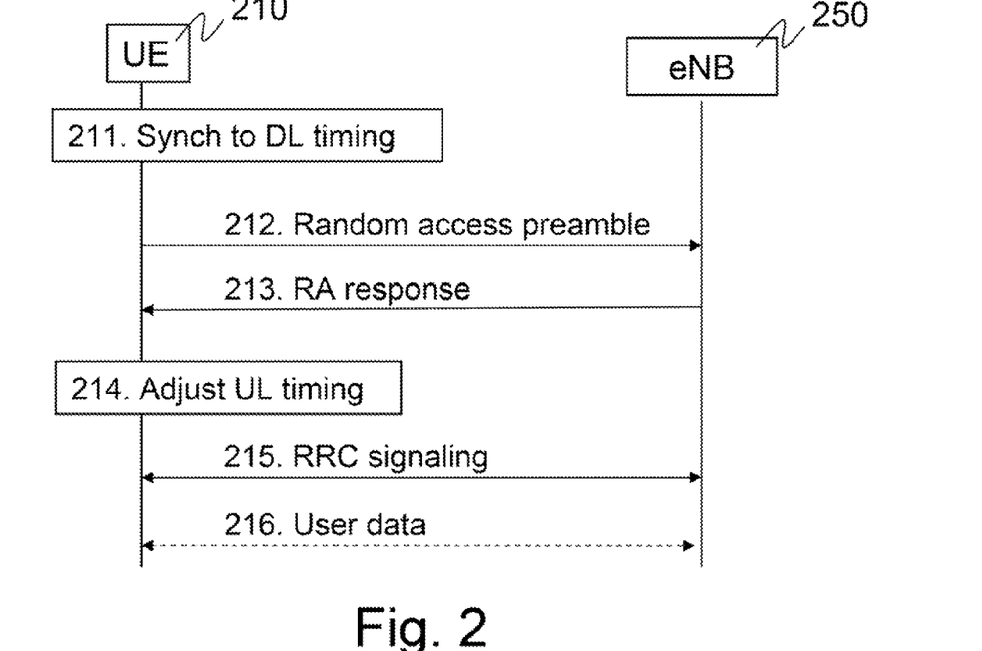
FIG. 2 illustrates schematically the RA procedure in e-UTRAN according to prior art.
Figure 3:
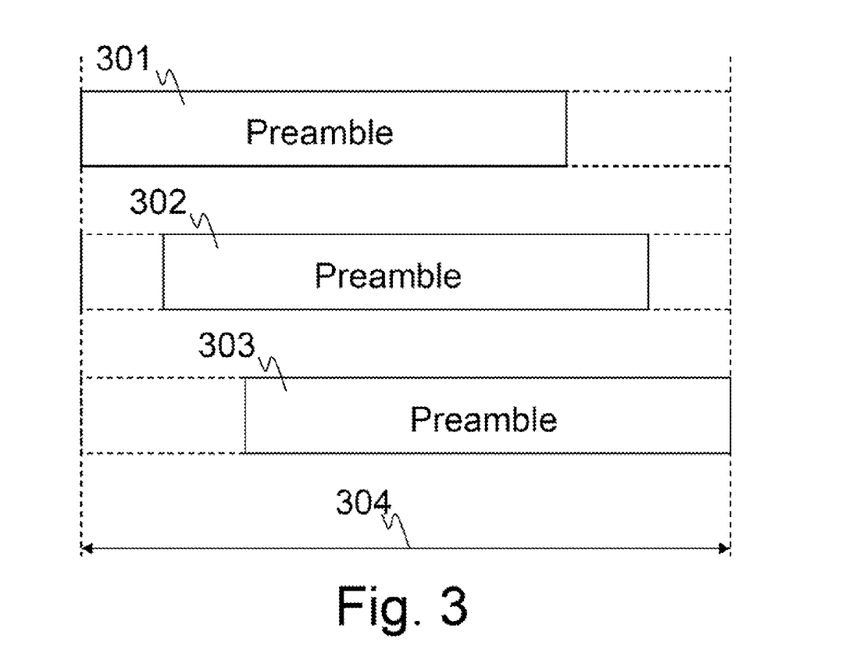
FIG. 3 illustrates schematically the preamble timings at the eNB in the RA subframe for a near, a medium distance, and a far away user according to prior art.

A fundamental requirement for any wireless communications system is the possibility for a UE to request a connection setup. This is commonly known as random access (RA). One purpose of the RA is to establish uplink synchronization. Random access is used not only for initial access, but also after periods of uplink inactivity when the uplink synchronization is lost even though the UE is still connected. The RA procedure in e-UTRAN is schematically illustrated in FIG. 2, involving a UE 210 and an eNB 250. The UE carrying out a RA attempt has already obtained downlink synchronization 211 from the cell search procedure. The first step is the transmission of the RA preamble 212 to the eNB. The main purpose of the preamble is to indicate a RA attempt and to obtain uplink time synchronization. The preamble allows the eNB to estimate the propagation delay and define a TA value for adjusting the UE transmission timing. The start of an uplink frame at the UE is defined relative to the start of the downlink frame at the UE. Due to the propagation delay between the eNB and the UE, the uplink transmission will therefore be delayed relative to the downlink transmission timing at the eNB. As the distance between the UE and the eNB is not known, there will be an uncertainty in the uplink timing corresponding to twice the distance between the eNB and the UE. To account for this uncertainty in the RA subframe, the preamble is shorter than the subframe. FIG. 3 illustrates schematically the preamble timings at the eNB in the RA subframe 304 for a user near the eNB 301, a medium distance user 302 and a far away user 303. The network broadcasts information to all UEs regarding in which radio resource that a RA preamble transmission is allowed. No uplink transmissions are scheduled in these radio resources to avoid interference between data and preambles.

Turning back to the RA procedure, the eNB will in response to the detected RA attempt and as a second step of the RA procedure, transmit a message—the RA response 213—comprising among other things the timing correction or TA value calculated based on the reception timing of the preamble, and a scheduling grant indicating the resources that the UE should use for the transmission of subsequent messages. When the UE receives the RA response 213, it adjusts 214 its uplink transmission timing according to the TA value. In the RA procedure, the preamble 212 is thus transmitted without TA adjustment while all subsequent subframes are time aligned based on the TA value.

When contention based RA is used, the UE selects a preamble from a group of randomly selectable preambles. There is a certain probability of contention when sending the RA preamble, meaning that more than one UE selects the same RA preamble for use at the same time. Resolving these collisions is part of the subsequent Radio Resource Control (RRC) signaling 215 of the RA procedure. The UE transmits necessary messages to the network using the resources indicated in the RA response and a contention resolution message is transmitted back to the UE, which ends the RA procedure. If the RA procedure is successful, a connection is established and the UE and the eNB may exchange user data 216. The eNB is responsible for continuously updating the TA value for the UE based on measurements of the transmitted user data, and to forward adjustments of the TA value to the UE.

The HO procedure may be described as a group of consecutive HO RRC signaling messages between a UE and a source eNB. Several X2 messages for the signaling between the source and target eNB are also needed when the source and target cells are in different eNBs. The HO procedure is schematically illustrated in the signaling diagram of FIG. 4a, involving a UE 420, a source eNB 430 and a target eNB 440. The procedure is started when the UE transmits a measurement report message 401 to the source eNB, where the measurement report indicates that a HO is needed. The measurement report thus triggers the HO procedure, and is based on downlink radio channel quality measurements in serving and neighboring cells. The UE reports a "best cell" list including all the neighboring cells which has higher radio channel quality than the serving cell. The source eNB makes a HO decision 402 based on the "best cell" list in the measurement report, and sends a HO request, in signal 403, via the X2 interface to the eNB that is determined to be the target. The target eNB reserves resources through the admission control procedure 404, and sends back a HO request acknowledgement 405 to the source eNB. When the source eNB receives the acknowledgement 405, it sends a HO command 406 to the UE. The UE will then access the target cell through the RA procedure comprising signals 407, 408, 409, in analogy with the procedure described above, which ends with a HO confirm message 410 transmitted to the target eNB.

In order to allow for a more efficient RA during the HO procedure, the target cell eNB selects a preamble that is allocated to the UE for the random access procedure. The target cell eNB also informs the source cell eNB about the allocated RA preamble for the UE to use for random access procedure at the HO. The source eNB informs the UE about the allocated preamble in the HO command. This will speed up the HO procedure, as there will be no doubt about which UE that is trying to access the target eNB. The uplink synchronization is thus performed using the allocated preamble.

Figure 4A:
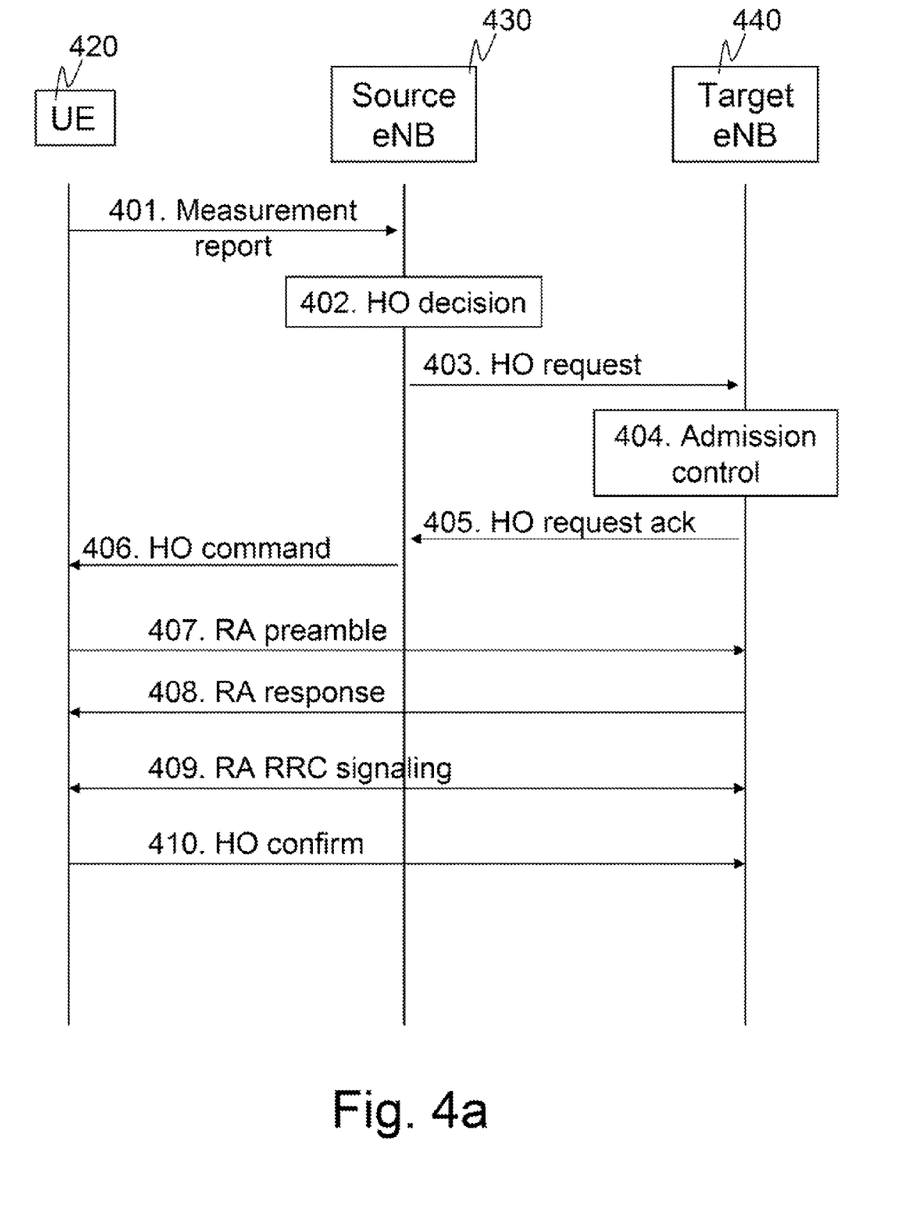
FIG. 4a illustrates schematically the HO procedure in e-UTRAN according to prior art.
Figure 4B:
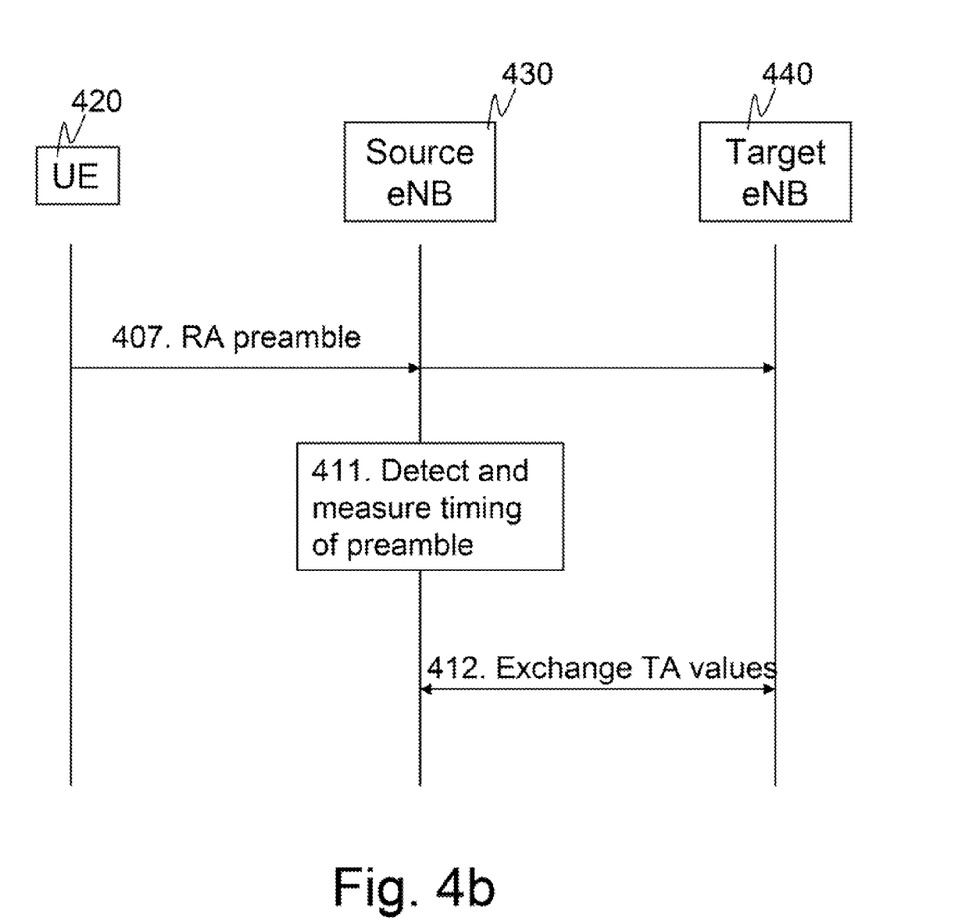
FIG. 4b illustrates schematically the basic idea of embodiments of the present invention.

The basic idea of the invention is described with reference to FIG. 4b, illustrating a signaling diagram of an embodiment of the present invention. As illustrated in FIG. 4a, a HO procedure has been triggered by a measurement report 410 from the UE 420, and a HO command 406 is received by the UE which will thus start a RA procedure with the target eNB 440. Before the HO, the source eNB has calculated a TA value referred to as TA1 that is used by the UE to adjust its transmission timing before the HO is effectuated. As the source eNB 430 knows which RA preamble that will be used by the UE 420 to obtain uplink synchronization with the target eNB 440 during the RA procedure, a time synchronization device in the source eNB 430 may also detect and measure 411 the reception timing of the preamble transmitted to the target eNB 440. By measuring the timing of this preamble, the time synchronization device in the source eNB will be able to calculate a TA value TA3 for the UE. However, TA3 will not be forwarded to the UE, as it is the target eNB 440 that is responsible for calculating and forwarding the correct TA value to the UE after the handover, referred to as TA2. The TA3 value may be used together with the TA1 and TA2 value to derive the offset between the target 440 and the source eNB 430, and may thus be used to adjust the synchronization of either the source or the target eNB. Information about the different TA values is exchanged 412 through the X2 interface between the source and target eNB. What information that is exchanged depends on which one of the eNBs that needs to be synchronized, and in which one of the eNBs that the offset is determined. In a first embodiment of the present invention, the offset is determined in the time synchronization device of the source eNB, and in a second embodiment the offset is determined in that time synchronization device of the target eNB. Preferably, the first embodiment is used when an adjustment of the time synchronization is needed in the source eNB. Alternatively, the offset calculated in the source eNB in this first embodiment is forwarded to the target eNB, in order for the target eNB to adjust its time synchronization based on the offset.

The time synchronization device of any of the source and target eNBs may thus retrieve the following information:
- TA1, corresponding to twice the propagation delay from source eNB to UE;
- TA2, corresponding to twice the propagation delay from target eNB to UE;
- TA3, corresponding to the propagation delay from the source eNB to the UE (i.e. ½ TA1), but offset with the propagation delay from the target eNB to the UE (i.e. ½ TA2) and the difference in time synchronization between the source and target eNB (i.e. the offset).

Figure 5A:
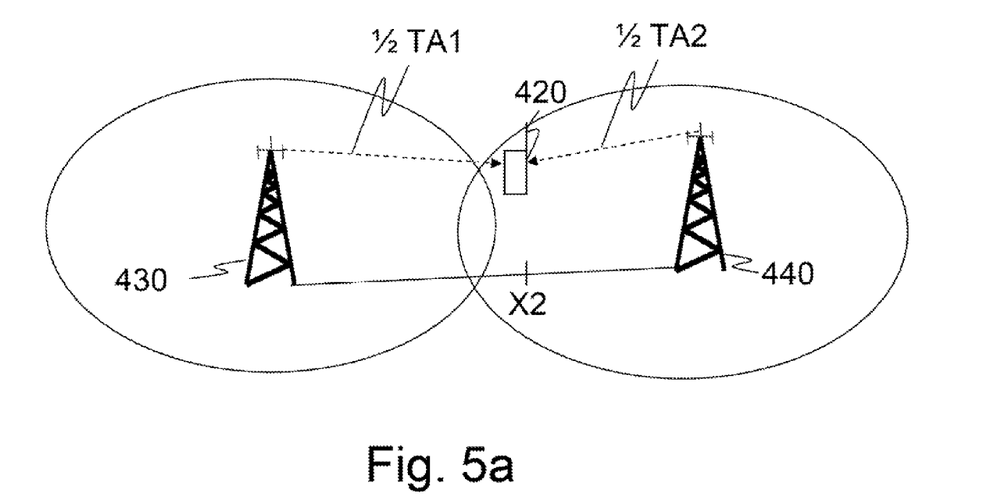
FIGS. 5a and 5b illustrate schematically what the different TA values used in embodiments of the present invention correspond to in terms of propagation delays.
Figure 5B:
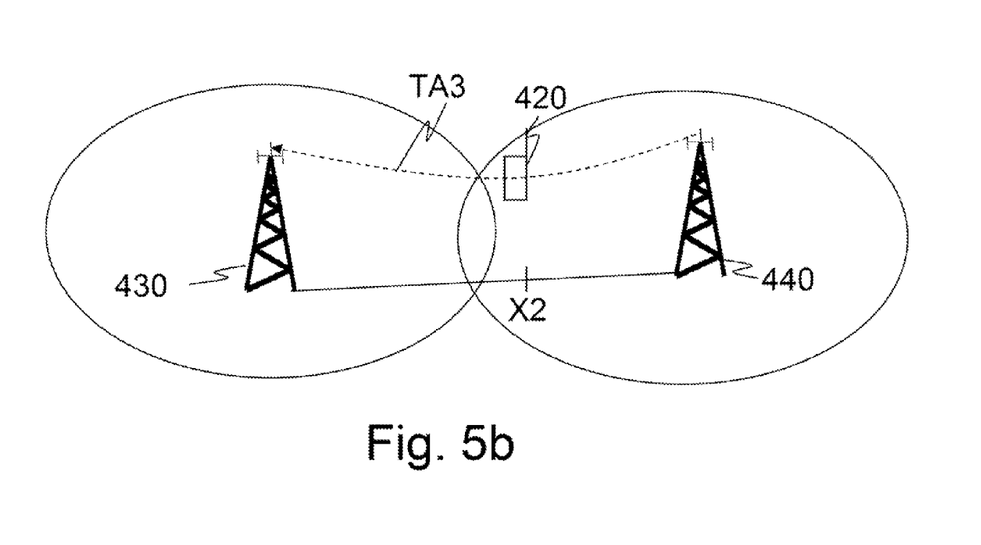

FIGS. 5a and 5b schematically illustrates what the different TA values correspond to in terms of propagation delays. As already mentioned above, it is possible to estimate the propagation delay between a UE and an eNB as half of the TA value, as the TA value corresponds to the delay of a signal transmitted from the eNB to the UE and back to the eNB again. FIG. 5a thus illustrates that the propagation delay between the source eNB 430 and the UE 420 may be estimated based on the TA1 value used before the HO, and that the propagation delay between the target eNB 440 and the UE 420 may be estimated based on the TA2 value used after the handover. The state the UE is in before the HO is in the following referred to as state A, and the state the UE is in after the HO is referred to as state B.

In state A, the UE time is locked to the source eNB. The source eNB knows the TA of the UE which corresponds to TA1. The propagation delay from the source eNB to the UE is therefore ½ TA1. In state B, the UE time is locked to the target eNB. The target eNB knows the TA of the UE which corresponds to TA2. The propagation delay from the target eNB to the UE is therefore ½ TA2.

FIG. 5b illustrates the situation when the time synchronization device of the source eNB 430 makes a measurement of an uplink transmission of the UE 420, when the UE is in state B. The device may thus derive a TA3, which is the TA value that should have been sent to the UE 420 assuming it would still be in state A.

In embodiments of the present invention, the transition between state A and state B is used to make the uplink measurement on the target eNB's RA preamble transmission. The advantage of using the preamble is that the time of the transmission and the actual preamble may be known by both the source and the target eNB, which will make it easy to detect. Furthermore, the transmission of the preamble is performed without using any TA adjustment as already described above, i.e. the transmission of the preamble is performed as soon as the UE receives the target eNB synchronization information (see also FIG. 5b). This removes one unknown parameter in the equation to calculate the offset between the two eNBs.

Figure 6:
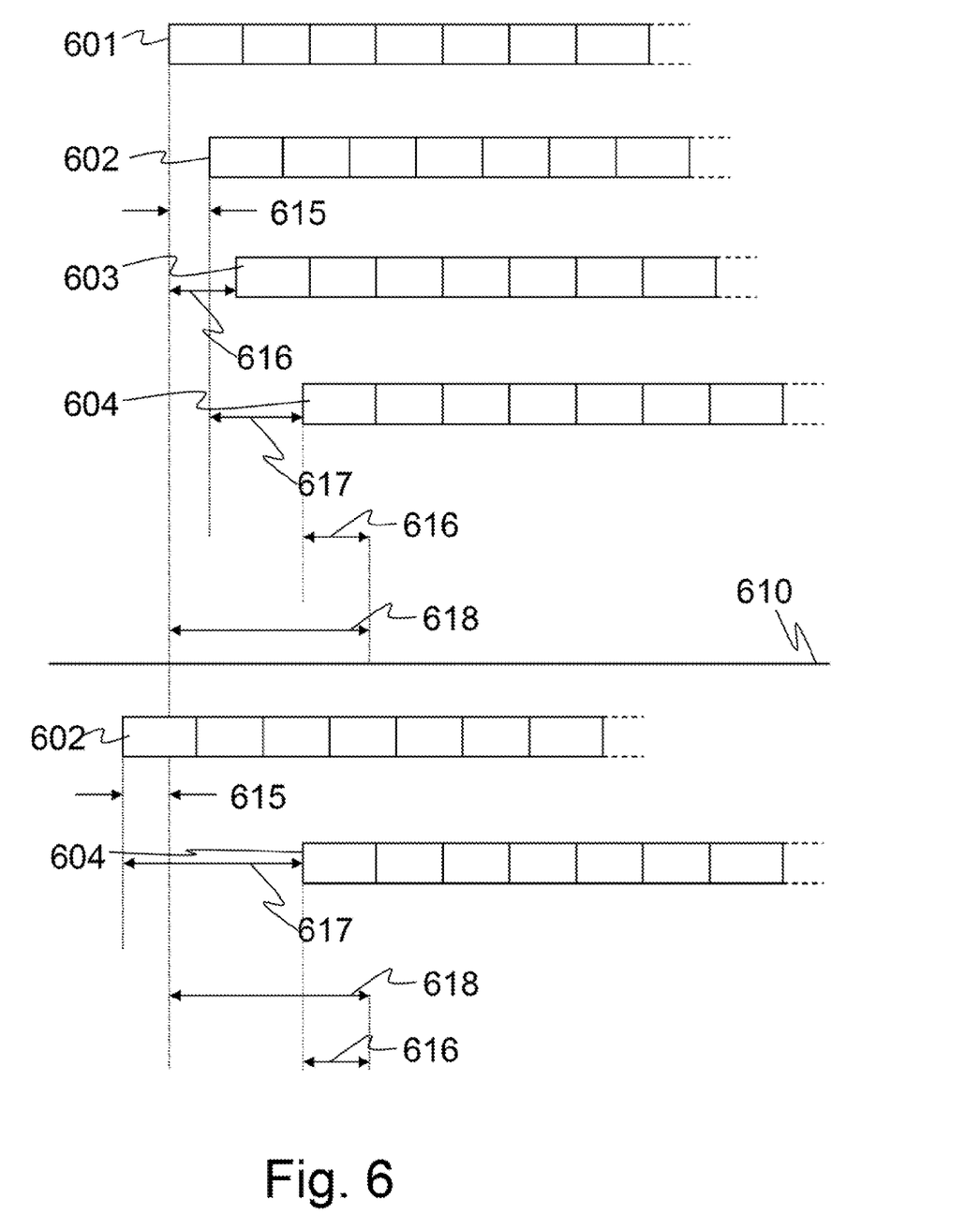
FIG. 6 illustrates schematically the timing of subframes transmitted by the source and target RBS and by the UE before and after a HO.

Based on TA1, TA2 and TA3, the time synchronization device placed in any of the two eNBs may thus determine the offset in time synchronization between the eNBs. This offset may then be used by the one of the two eNBs lacking a GPS synchronization signal, to adjust its oscillator. The transmission timing of subframes at the source eNB 601 and at the target eNB 602, and the reception timing of subframes at the UE in state A 603 (before the HO), and at the UE in state B 604 (after the HO) is schematically illustrated in FIG. 6. One of the eNBs time synchronization has drifted due to that the GPS synchronization signal is lacking, and there is therefore an offset 615 between the source and target eNB timing. Above the horizontal line 610, the target eNB lags behind the source eNB, and below the horizontal line 610, the target eNB timing is in advance of the source eNB timing. The time delay of the subframe when received at the UE in state A 616 corresponds to half the TA1 value, and the time delay of the subframe when received at the UE in state B 617 corresponds to half the TA2 value. The TA3 value 618 is also indicated in the figure, illustrating the time of reception at source eNB of the preamble transmitted from the UE in state B: the reception time 604 plus the propagation delay 616. Thus the following equation may be used to derive the offset 615 between the source and target eNB:

$$\text{offset} = TA3 - \frac{TA2 + TA1}{2} \quad [1]$$

It is assumed that a positive value of the offset indicates that the target eNB lags behind the source eNB in timing, and a negative value indicates the opposite, as illustrated above and below the line 610 respectively.

As an example it may be noted that if the handover is performed when the UE is at an equal distance from the source and the target eNB, the propagation delay to the UE from each respective eNB would be equal, and TA1 would be equal to TA2. This would mean that the value of TA3 would be identical to TA2 (or TA1) when the two eNBs are time synchronized. If not synchronized the difference between TA3 and TA2 (or TA1) would correspond to the offset between the eNBs.

In embodiments of the present invention, it may be possible for the time synchronization device of the target eNB to select the RA preamble among a set of contention free preambles, thereby avoiding collisions during the HO RA procedure and increasing the probability of a successful measurement of TA values. Another possibility is to use pre-configured preambles that are known to both source and target eNBs and are dedicated for the TA measurements of the present invention and never used for any other RA. The dedicated preambles may in this embodiment be selected in such a way that the probability to succeed with the measurement of the preamble in the source eNB is increased.

Figure 7A:
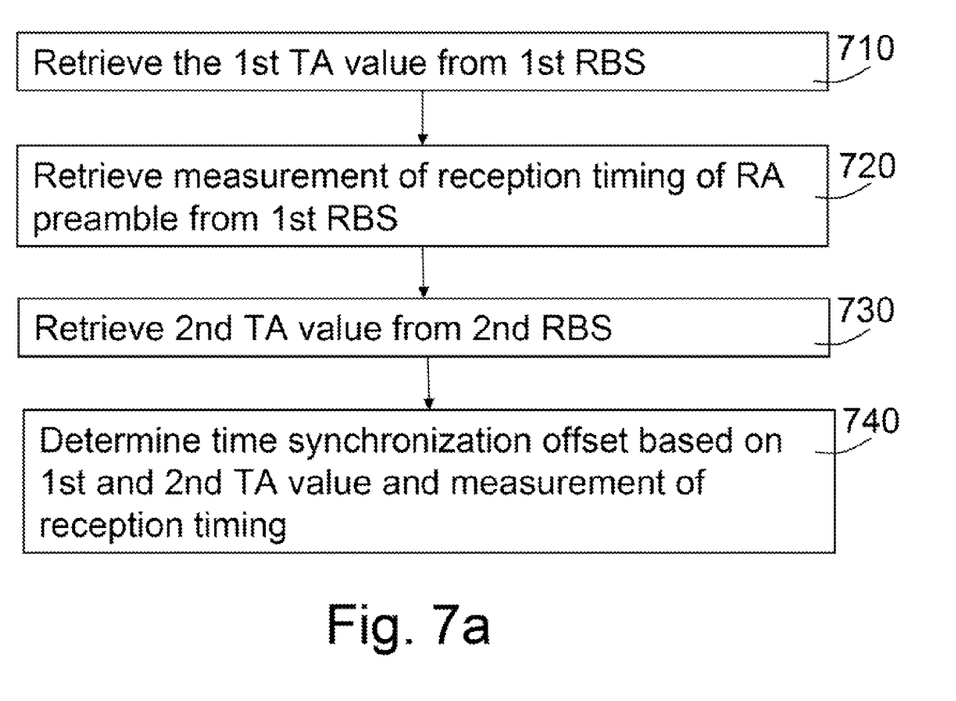
FIGS. 7a-b are flowcharts of the method in the time synchronization device according to embodiments of the present invention.

FIG. 7a is a flowchart of the method in the time synchronization device according to one embodiment of the present invention. The device may in one embodiment be placed an eNB of an e-UTRAN. The method illustrated in the flowchart comprises the following:

710: Retrieve from the first RBS a first TA value used by the UE to adjust its transmission timing before the HO. The first RBS is thus the source RBS. This TA1 value corresponds to twice the propagation delay between the source RBS and the UE at the time of the HO.

720: Retrieve from the source RBS a measurement of a reception timing of a RA preamble. The RA preamble is transmitted from the UE to the second or target RBS during synchronization. However, the preamble is known to the source RBS and may also be detected and measured by the source RBS.

730: Retrieve from the target RBS a second TA value, TA2, used by the UE to adjust its transmission timing after the HO. This TA2 value corresponds to twice the propagation delay between the target RBS and the UE at the time of the HO.

740: Determine a time synchronization offset between the source and target RBS based on the retrieved first TA value, the second TA value, and the measurement of the reception timing of the RA preamble.

Figure 7B:
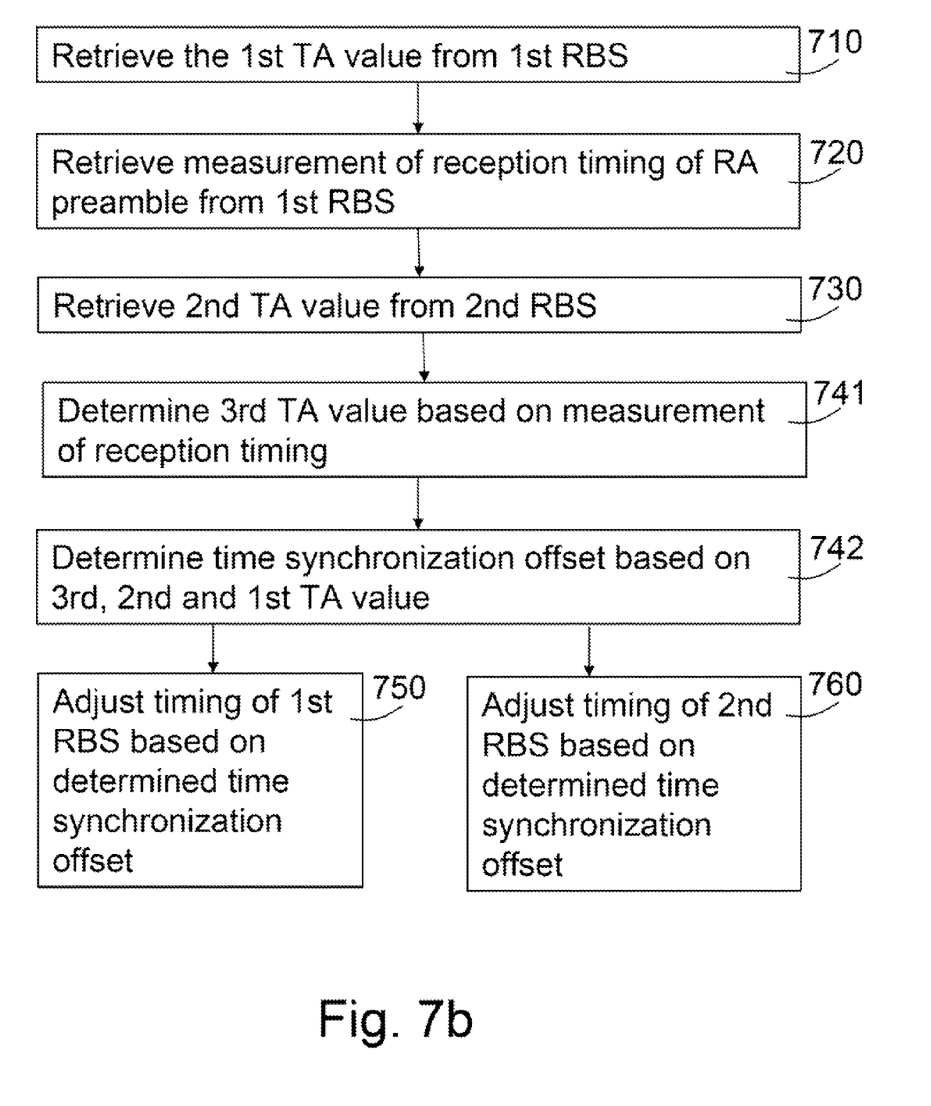

FIG. 7b is a flowchart of the method in the time synchronization device according to other embodiments of the present invention. In these embodiments, the method comprises the following:

710: Retrieve from the first RBS a first TA value used by the UE to adjust its transmission timing before the HO.

720: Retrieve from the source RBS a measurement of a reception timing of a RA preamble.

730: Retrieve from the target RBS a second TA value, TA2, used by the UE to adjust its transmission timing after the HO.

741: Determine a third TA value—TA3—based on the measurement of the reception timing of the RA preamble.

742: Determine the time synchronization offset based on the difference between the third TA value and half of the sum of the first and second TA values.

750: Adjust the timing of the source RBS based on the determined time synchronization offset. This is the case when it is the source RBS that lacks a correct GPS signal to synchronize with and thus needs an adjustment of the oscillator which controls the time base generator.

760: Adjust the timing of the target RBS based on the determined time synchronization offset. This is the case when it is the target RBS that lacks a correct GPS signal to synchronize with and thus needs an adjustment of the oscillator which controls the time base generator.

Steps 750 and 760 are thus alternatives, which one of the two to use is determined by which of the source or target RBS that is not synchronized to a stable clock reference.

Figure 8A:
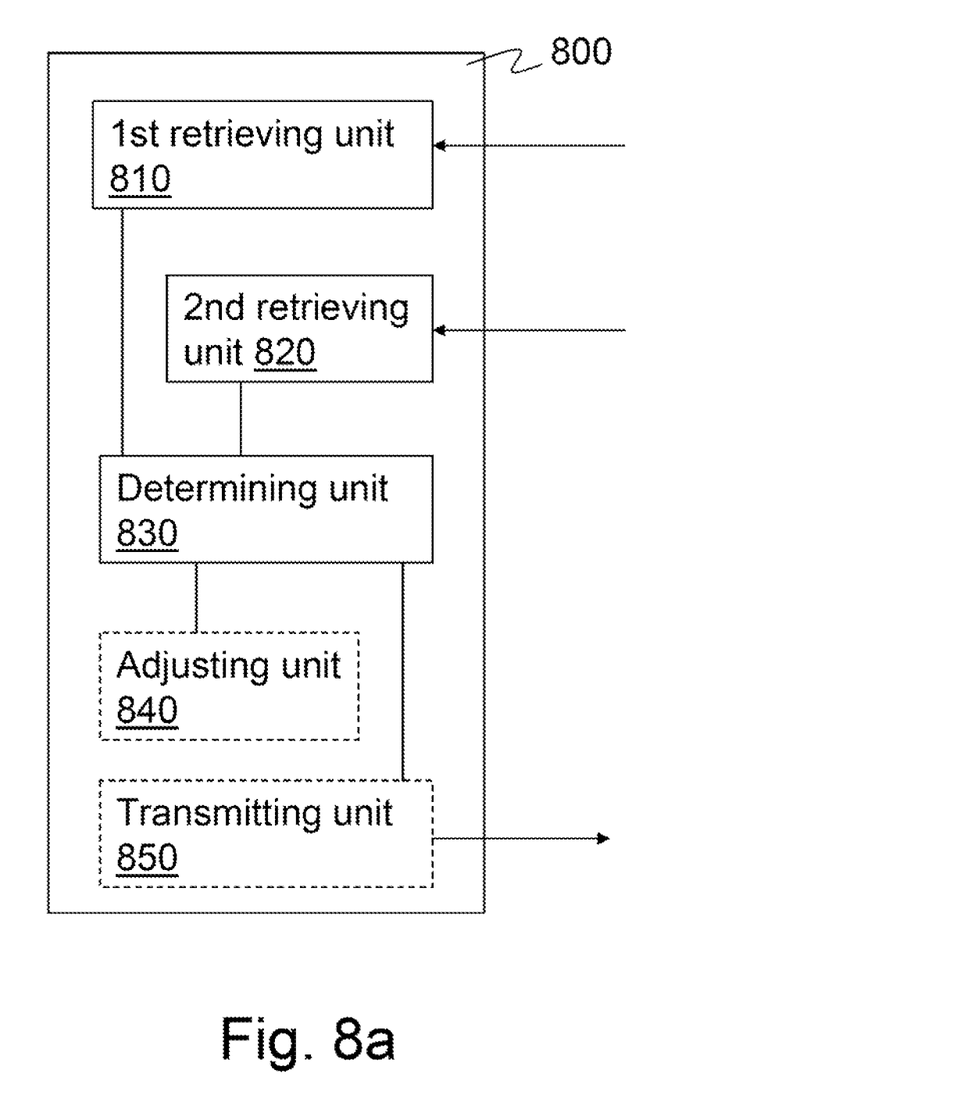
FIG. 8a illustrates schematically the time synchronization device according to embodiments of the present invention.

The time synchronization device 800 is schematically illustrated in FIG. 8a, according to embodiments of the present invention. The device 800 is connectable to a first and a second RBS of a wireless communications system, i.e. to a source and a target RBS respectively. The device comprises a first retrieving unit 810 configured to retrieve from the source RBS a first TA value, TA1, used by a UE to adjust its transmission timing before a HO from the source to the target RBS, and a measurement of the reception timing of a RA preamble transmitted by the UE to the target RBS during synchronization. The device also comprises a second retrieving unit 820 configured to retrieve from the target RBS a second TA value, TA2, used by the UE to adjust its transmission timing after the HO. Furthermore, the device comprises a determining unit 830 configured to determine a time synchronization offset between the source and target RBS based on the retrieved first TA value, the second TA value and the measurement of the reception timing of the RA preamble. In one embodiment, the determining unit 830 is configured to determine a third TA value, TA3, based on the measurement of the reception timing of the RA preamble, and to determine the offset based on the first, second and third TA value according to equation [1] above.

In an embodiment of the present invention, the time synchronization device 800 is configured to be placed in an RBS. This may be either the source RBS or the target RBS. When the device is placed in the source RBS, the second retrieving unit is configured to retrieve the second TA value, TA2, from the target RBS over the X2 interface. When the device is placed in the target RBS, the first retrieving unit is configured to retrieve the first TA value, TA1, and the preamble timing measurement from the source RBS over the X2 interface. According to still another embodiment, the device comprises an adjusting unit 840 configured to adjust the timing of the source or the target RBS based on the determined time synchronization offset. In order to handle a situation when the device is placed in the source RBS and it is the target RBS that needs to be synchronized (or the opposite), the device comprises a transmitting unit 850 which is configured to transmit the determined offset over the X2 interface to the other RBS.

Figure 8B:
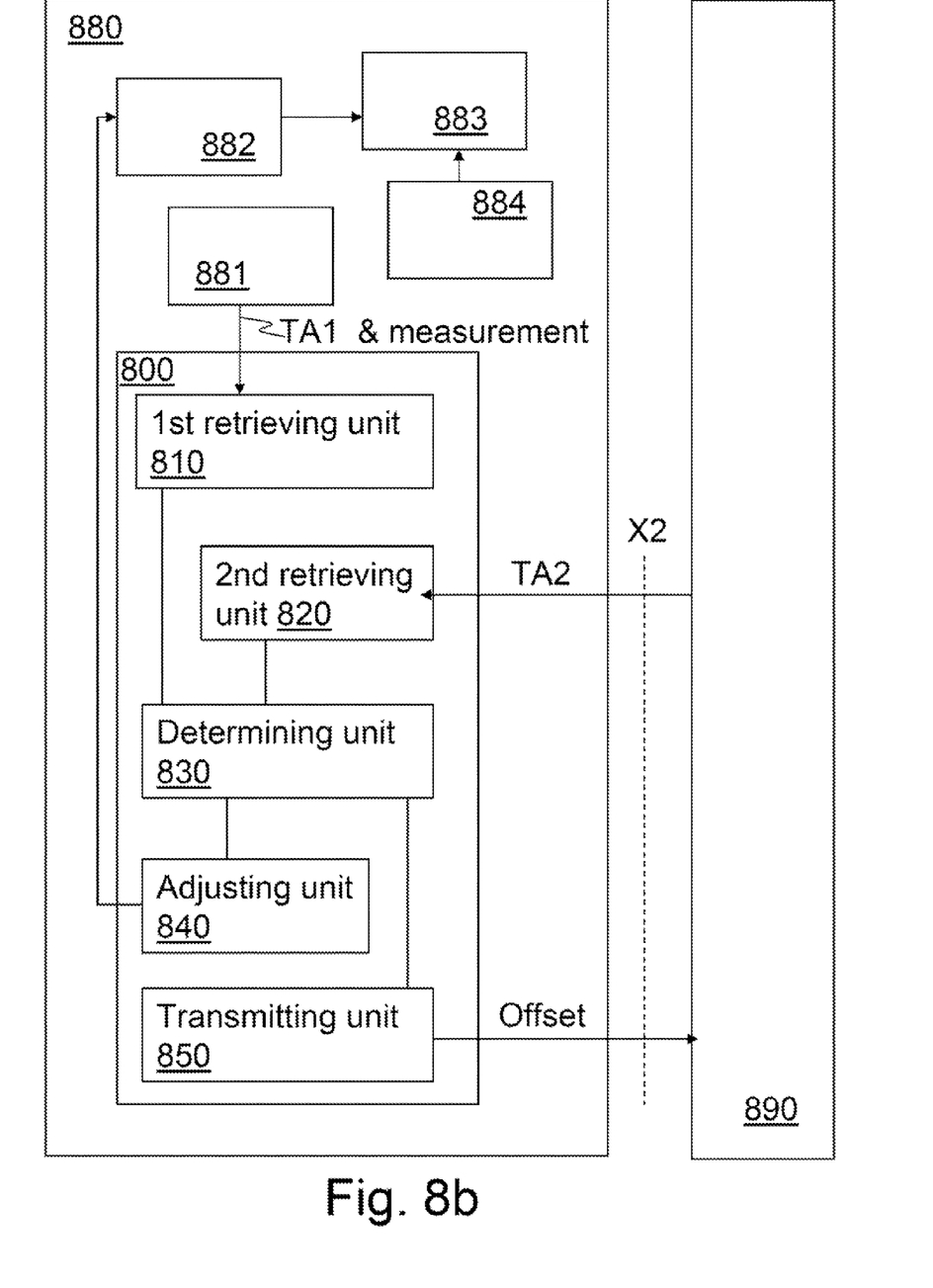
FIG. 8b illustrates schematically the radio base station according to embodiments of the present invention.

FIG. 8b illustrates an RBS 880 comprising a time synchronization device 800 as described above with reference to FIG. 8a. In one embodiment, the RBS 880 is a source RBS, and the first retrieving unit 810 of the device is configured to retrieve the first TA value from a signal processing system 881 of the RBS. The adjusting unit 840 is configured to adjust the timing of the source RBS based on the determined offset, by e.g. controlling the oscillator 882 in the RBS 880, which in turn affects the time base generator 883. The time base generator 883 is normally provided with a synchronization signal by the GPS receiver 884.

The above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

3GPP 3rd Generation Partnership Project
ASIC Application Specific Integrated Circuit
eNodeB evolved Node B
e-UTRAN evolved UTRAN
FDD Frequency Division Duplex
GPS Global Positioning System
HO Handover
LTE Long-Term Evolution
MBSFN Multicast Broadcast Single Frequency Networks
RA Random Access
RBS Radio Base Station
TA Timing Advance
TDD Time Division Duplex
TD-SCDMA Time Division Synchronous Code Division Multiple Access
UE User Equipment
UMTS Universal Mobile Telecommunications System
UTRAN Universal Terrestrial Radio Access Network

The invention claimed is:

1. A method for a time synchronization device connected to a first and a second radio base station of a wireless communications system, the method being performed after the first radio base station has transmitted a handover command to a user equipment, the command indicating a handover to the second radio base station, the method comprising:
   retrieving from the first radio base station:
      a first timing advance value used by the user equipment to adjust its transmission timing before the handover, and
      a measurement of a reception timing of a random access preamble, the random access preamble being transmitted from the user equipment to the second radio base station during synchronization,
   retrieving from the second radio base station a second timing advance value used by the user equipment to adjust its transmission timing after the handover,
   determining a time synchronization offset between the first and second radio base station based on the retrieved first timing advance value, second timing advance value, and measurement of the reception timing.

2. The method according to claim 1, wherein the device is placed in the first radio base station, and wherein the second timing advance value is retrieved over an X2 interface.

3. The method according to claim 2, further comprising adjusting the timing of the first radio base station based on the determined time synchronization offset.

4. The method according to claim 2, wherein the determined time synchronization offset is transmitted to the second radio base station over the X2 interface, in order for the second radio base station to adjust its timing based on the determined time synchronization offset.

5. The method according to claim 1, wherein the device is placed in the second radio base station, and wherein the first timing advance value, and the measurement of the reception timing of the random access preamble are retrieved over an X2 interface.

6. The method according to claim 5, further comprising adjusting the timing of the second radio base station based on the determined time synchronization offset.

7. The method according to claim 5, wherein the determined time synchronization offset is transmitted to the first radio base station over the X2 interface, in order for the first radio base station to adjust its timing based on the determined time synchronization offset.

8. The method according to claim 1, wherein determining a time synchronization offset comprises determining a third timing advance value based on the measurement of the reception timing of the random access preamble, and determining the time synchronization offset based on the difference between said third timing advance value and half of the sum of the first and second timing advance value.

9. A time synchronization device, connectable to a first and a second radio base station of a wireless communications system, the device comprising:
 a memory; and
 a processor coupled to the memory, wherein the processor is configured, when executing one or more programs stored in the memory, to:
  retrieve from the first radio base station:
   a first timing advance value used by a user equipment to adjust its transmission timing before a handover from the first to the second radio base station, and
   a measurement of a reception timing of a random access preamble transmitted by the user equipment to the second radio base station during synchronization,
  retrieve from the second radio base station:
   a second timing advance value used by the user equipment to adjust its transmission timing after the handover,
   determine a time synchronization offset between the first and second radio base station based on the retrieved first timing advance value, second timing advance value and measurement of the reception timing.

10. The device according to claim 9, wherein the device is configured to be placed in the first radio base station, and wherein the processor is further configured to retrieve the second timing advance value from the second radio base station over the X2 interface.

11. The device according to claim 10, wherein the processor is further configured to adjust the timing of the first radio base station based on the determined time synchronization offset.

12. The device according to claim 10, wherein the processor is further configured to transmit the determined time synchronization offset to the second radio base station over the X2 interface, in order for the second radio base station to adjust its timing based on the determined time synchronization offset.

13. The device according to claim 9, wherein the device is configured to be placed in the second radio base station, and wherein the processor is further configured to retrieve the first timing advance value and the measurement of the reception timing of the random access preamble from the first radio base station over the X2 interface.

14. The device according to claim 13, wherein the processor is further configured to adjust the timing of the second radio base station based on the determined time synchronization offset.

15. The device according to claim 13, wherein the processor is further configured to transmit the determined time synchronization offset to the first radio base station over the X2 interface, in order for the first radio base station to adjust its timing based on the determined time synchronization offset.

16. The device according to claim 9 wherein the processor is further is further configured to determine a third timing advance value based on the measurement of the reception timing of the random access preamble, and determining the time synchronization offset based on the difference between said third timing advance value and half of the sum of the first and second timing advance value.

17. A radio base station comprising:
 a time synchronization device, connectable to a first and a second radio base station of a wireless communications system;
 a memory; and
 a processor coupled to the memory, wherein the processor is configured, when executing one or more programs stored in the memory, to:
  retrieve from the first radio base station:
   a first timing advance value used by a user equipment to adjust its transmission timing before a handover from the first to the second radio base station, and
   a measurement of a reception timing of a random access preamble transmitted by the user equipment to the second radio base station during synchronization,
  retrieve from the second radio base station:
   a second timing advance value used by the user equipment to adjust its transmission timing after the handover,
   determine a time synchronization offset between the first and second radio base station based on the retrieved first timing advance value, second timing advance value and measurement of the reception timing.

* * * * *